(12) United States Patent
Kishi et al.

(10) Patent No.: US 7,680,863 B2
(45) Date of Patent: Mar. 16, 2010

(54) CONTENTS PROVIDING METHOD, CONTENTS PROVIDING SYSTEM, AND CONTENTS SERVER

(75) Inventors: Nobuya Kishi, Yamatokoriyama (JP); Kenichiroh Imayoshi, Soraku-gun (JP); Daisuke Ueda, Ikoma (JP); Takateru Yamamoto, Uji (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 369 days.

(21) Appl. No.: 11/105,046

(22) Filed: Apr. 12, 2005

(65) Prior Publication Data
US 2005/0240597 A1 Oct. 27, 2005

(30) Foreign Application Priority Data
Apr. 12, 2004 (JP) ............................. 2004-116902

(51) Int. Cl.
*G06F 17/30* (2006.01)
(52) U.S. Cl. ........................................ 707/758; 707/782
(58) Field of Classification Search ........................ None
See application file for complete search history.

(56) References Cited

U.S. PATENT DOCUMENTS

| | | | | |
|---|---|---|---|---|
| 4,529,978 A * | 7/1985 | Rupp | ........................... | 345/16 |
| 4,809,005 A * | 2/1989 | Counselman, III | ........... | 342/352 |
| 5,200,818 A * | 4/1993 | Neta et al. | ...................... | 348/39 |
| 5,323,322 A * | 6/1994 | Mueller et al. | ............... | 701/215 |
| 5,949,551 A * | 9/1999 | Miller et al. | ................. | 358/408 |
| 6,215,913 B1 * | 4/2001 | Clatanoff et al. | ............. | 382/275 |
| 6,321,158 B1 * | 11/2001 | DeLorme et al. | ............. | 701/211 |
| 6,429,812 B1 * | 8/2002 | Hoffberg | .................. | 342/357.1 |
| 6,975,299 B2 * | 12/2005 | Lapstun et al. | .............. | 345/156 |
| 2003/0068074 A1 * | 4/2003 | Hahn | ......................... | 382/128 |
| 2003/0093790 A1 * | 5/2003 | Logan et al. | .................. | 725/38 |
| 2003/0182052 A1 * | 9/2003 | DeLorme et al. | ............ | 701/201 |
| 2003/0218562 A1 * | 11/2003 | Orr | ............................. | 342/20 |
| 2003/0229441 A1 * | 12/2003 | Pechatnikov et al. | ........ | 701/201 |

(Continued)

FOREIGN PATENT DOCUMENTS

JP 09-046680 2/1997

(Continued)

OTHER PUBLICATIONS

Wahl, "Using Keyhole 2 PRO/EC Version 2.2", Sep. 2004, Keyhole Inc., p. 1-146.*

(Continued)

*Primary Examiner*—Khanh B Pham
(74) *Attorney, Agent, or Firm*—Edwards Angell Palmer & Dodge LLP; David G. Conlin; David A. Tucker

(57) ABSTRACT

In response to a contents data transmission request from a user terminal, a contents storage server encodes a contents data meeting the transmission request by vector coding or hierarchical coding and transmits the encoded contents data to the user terminal. The user terminal having received the encoded data notifies a charging server of information on a resolution selected by the user and then receives information needed for a corresponding decoding process from the charging server. The charging server carries out a charging process based on the received information on the resolution.

8 Claims, 8 Drawing Sheets

U.S. PATENT DOCUMENTS

| | | | | |
|---|---|---|---|---|
| 2004/0010467 A1* | 1/2004 | Hori et al. | ............... | 705/50 |
| 2004/0098344 A1* | 5/2004 | Nakanishi et al. | ............. | 705/52 |
| 2004/0196972 A1* | 10/2004 | Zhu et al. | ............... | 380/45 |
| 2005/0201726 A1* | 9/2005 | Malcolm et al. | ............. | 386/94 |
| 2005/0216417 A1* | 9/2005 | Risan et al. | ............... | 705/52 |

FOREIGN PATENT DOCUMENTS

| | | |
|---|---|---|
| JP | 2002-222237 | 8/2002 |
| JP | 2002-358325 | 12/2002 |
| JP | 2004-056599 | 2/2004 |

OTHER PUBLICATIONS

Archive.org, www.omnistar.com, "Web Page", Feb. 2003, <Retrieved from the web Apr. 8, 2008>, p. 1-2.*

Eastman, "IDRISI32 Release 2 Guide to GIS and Image Processing", May 2001, Clark Labs—Clark Univ., vol. 1, p. 1-161.*

Ecker, "Differential Global Positioning System Broadcast Standard", Apr. 21, 1993, US Dept. of Transportation, US Coast Guard, 49 pages total. <Retrieved from the internet Oct. 15, 2008>.*

Lindy, "Differential Solutions Using Long-Range Dual-Frequency GPS Correction Data", Sep. 2002, Naval Postgraduate School, Monterey, CA, 101 pages total. <Retrieved from the internet Oct. 16, 2008>.*

Lewis et al, "Workshop Report: The Potential Uses of Commercial Satellite Imagery in the Middle East", Jun. 30, 1999, United Nations Institute for Disarmament Research, Cooperative Monitoring Center, Sandia National Laboratories, 49 pages, <Retrieved from USDOE web site May 2, 1999>.*

Senkowsky, "High-Tech Surveillance: Adapting New Technology for Marine Studies", Dec. 2003, BioScience, vol. 53, No. 12, p. 1150-1158, <Retrieved from NPL Search Engine Apr. 27, 2009>.*

Tucker et al, "African Land-Cover Classification Using Satellite Data", Jan. 25, 1985, Science, vol. 227, No. 4685, p. 369-375, <Retrieved from JSTOR Science AAAS May 2, 2009>.*

* cited by examiner

| MAP 1 | KEY 1 | | | |
|---|---|---|---|---|
| | AMOUNT OF INFORMATION | 1:160,000 ≦ S ≦ 1:80,000 | CHARGE LEVEL 0 | DECODING KEY 01 |
| | | 1:80,000 < M ≦ 1:20,000 | CHARGE LEVEL 1 | DECODING KEY 11 |
| | | 1:20,000 < L ≦ 1:4,000 | CHARGE LEVEL 2 | DECODING KEY 21 |
| | | 1:4,000 < LL ≦ 1:2,000 | CHARGE LEVEL 3 | DECODING KEY 31 |
| MAP 2 | KEY 2 | | | |
| | AMOUNT OF INFORMATION | 1:160,000 ≦ S ≦ 1:80,000 | CHARGE LEVEL 0 | DECODING KEY 02 |
| | | 1:80,000 < M ≦ 1:20,000 | CHARGE LEVEL 1 | DECODING KEY 12 |
| | | 1:20,000 < L ≦ 1:4,000 | CHARGE LEVEL 2 | DECODING KEY 22 |
| | | 1:4,000 < LL ≦ 1:2,000 | CHARGE LEVEL 3 | DECODING KEY 32 |
| MAP 3 | KEY 3 | | | |
| | AMOUNT OF INFORMATION | 1:160,000 ≦ S ≦ 1:80,000 | CHARGE LEVEL 0 | DECODING KEY 03 |
| | | 1:80,000 < M ≦ 1:20,000 | CHARGE LEVEL 1 | DECODING KEY 13 |
| | | 1:20,000 < L ≦ 1:4,000 | CHARGE LEVEL 2 | DECODING KEY 23 |
| | | 1:4,000 < LL ≦ 1:2,000 | CHARGE LEVEL 3 | DECODING KEY 33 |
| ... | ... | | | |
| | ... | ... | ... | ... |
| | | ... | ... | ... |
| | | ... | ... | ... |
| | | ... | ... | ... |

FIG. 3

CONTENTS PROVIDING METHOD, CONTENTS PROVIDING SYSTEM, AND CONTENTS SERVER

CROSS REFERENCE

This Nonprovisional application claims priority under 35 U.S.C. §119(a) on Patent Application No. 2004-116902 filed in Japan on Apr. 12, 2004, the entire contents of which are hereby incorporated by reference.

BACKGROUND OF THE INVENTION

The present invention relates to contents providing method, contents providing system and contents server for providing a user terminal with contents desired by the user via a network.

In one example of utilization of Internet, desired information is obtained from a server connected to Internet. On Internet there exist contents servers each acting to provide a user terminal with information desired by the user. Such a contents server has contents data, such as image data and sound data, stored therein. When the user requests his or her desired contents data, the contents server provides the user terminal with the desired contents data.

Conventionally, various techniques for contents data distribution by a contents server have been developed. For example, the invention described in Japanese Laid-Open Patent Application No. 2002-222237 adopts the technique of communicating information on contents data sizes and resolutions between the contents server and the user terminal in obtaining desired contents data from the contents server. Also, the invention described in Japanese Laid-Open Patent Application No. H09-046680 adopts the technique of automatically selecting a resolution for desired contents data depending on the density of communications on a network in transmitting the contents data.

With the former technique, however, the user's terminal must be kept connected to the contents server all the way during a period from the start to finish of specifying a contents data size and a resolution. For this reason, the time period during which the contents server is kept connected to one user terminal becomes longer, which results in a decreased number of user terminals which are allowed to connect to the contents server within a fixed time period.

With the latter technique, a lower resolution is selected for the desired contents data to relieve congestion of communications on the network and, hence, it is possible that the desired contents data is transmitted to the user terminal with a resolution undesired by the user.

A feature of the present invention is to provide contents providing method, contents providing system and contents server which are capable of providing a user terminal with contents data desired by the user and carrying out a proper money-charging process in accordance with selection made by the user while reducing the load to be imposed on a contents server in responding to the user terminal.

SUMMARY OF THE INVENTION

According to the present invention, there is provided a contents providing method wherein a contents server transmits an encoded contents data to a user terminal where the encoded contents data can be restored to a contents data with any one of plural quality levels. Such an encoded contents data to be transmitted is a contents data which has been encoded so that a corresponding contents data to be reproduced will vary in quality level according to selection of decoding process. Here, the term "quality" is meant by a sound quality if the contents data is a sound data or by an image quality if the contents data is an image data. Usually, the quality level of a contents data is proportional to the amount of information contained in the contents data; that is, a contents data to be reproduced with a higher quality level has a larger amount of information and requires a higher charge to the user.

The quality level of a contents data obtained by the user is determined by what decoding process the user selects to decode a received encoded contents data. The contents server has stored therein charge levels made corresponding to respective decoding processes and carries out a charge process to charge the user according to the quality level with which the user has obtained the contents data.

In the present invention, the contents server needs to perform processes with respect to the user terminal which only include, in principle, a process of transmitting an encoded contents data encoded from a contents data desired by the user to the user terminal, and a process of transmitting information required for a decoding process for obtaining the contents data with a quality level desired by the user upon receipt of information on the desired quality level for contents data.

In view of the development of an infrastructure for supporting Internet such as the prevalence of optical fiber, the present invention pays attention to lightening the load to be imposed on the contents server in responding to user terminals rather than reducing the amount of data to be communicated through Internet.

The foregoing and other features and attendant advantages of the present invention will become more apparent from the reading of the following detailed description of the invention in conjunction with the accompanying drawings.

BRIEF DESCRIPTION OF THE DRAWINGS

FIG. 3 shows a portion of a rule table showing correspondences of amounts of information with charge levels and decoding keys;

DETAILED DESCRIPTION OF THE PREFERRED EMBODIMENTS

The present invention will now be described in detail with reference to the accompanying drawings.

Figure 1:
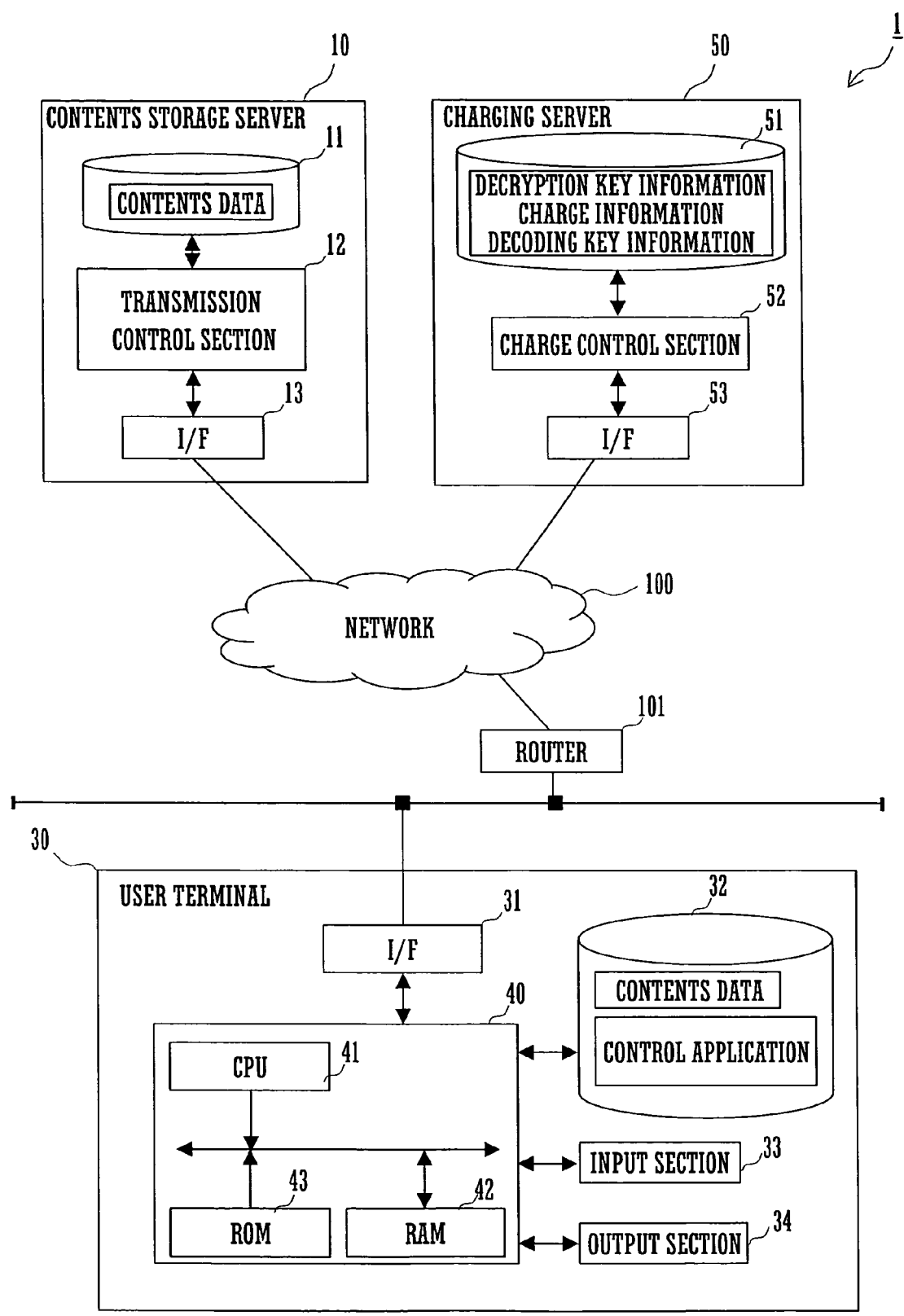
FIG. 1 illustrates the configuration of a contents providing system according to a first embodiment of the present invention.

Referring initially to FIG. 1, a contents providing system 1 includes a contents storage server 10, a user terminal 30, and a charging server 50. Here, the contents storage server 10 and the charging server 50 constitute the contents server defined by the present invention. The contents storage server 10, user terminal 30 and charging server 50 are connected to each other via a network 100. In the present embodiment the network 100 comprises Internet and public line network both.

The contents storage server 10 includes a storage section 11, a transmission control section 12, and an interface section 13. The storage section 11 constitutes the recording section defined by the present invention. The storage section 11 is connected to the network 100 via the interface section 13 and transmission control section 12. In the present embodiment the data format of the contents stored in the storage section 11 is SVG (Scaleable Vector Graphic.) Nevertheless, the present invention may use any other scaleable data format than SVG.

In this embodiment the storage section 11 has stored therein image data on maps as contents data. The image data stored in the storage section 11 is not limited to image data on maps, but may be image data on landscape photos or portraits of actors, actresses, sports players and the like. The contents are not limited to still pictures, but may be motion pictures including movies or sound files including music.

The transmission control section 12 constitutes the encoding section defined by the present invention. The transmission control section 12 has the functions of: receiving a contents data transmission request from the user terminal 30; reading a contents data meeting the contents data transmission request out of the storage section 11; encoding the contents data thus read; and transmitting the contents data thus encoded to the user terminal 30.

In the present embodiment the encoding process is a vector coding process. The vector-coded contents data will be restored to an image data with an image quality level which varies according to which of decoding processes is selected.

The interface section 13 is connected to the network 100 and the transmission control section 12. The interface section 13 connects or disconnects the contents storage server 10 to or from the user terminal 30 by switching in accordance with signals from the transmission control section 12. The interface section 13 is connected to an interface section 31 of the user terminal 30 and to an interface section 53 of the charging server 50 via the network 100.

The interface section 31 of the user terminal 30 is connected to a control section 40. This control section 30 is connected to an input section 33, an output section 34, and a hard disk 32. The control section 40 includes ROM 43, RAM 42, and CPU 41. The ROM 43 has stored therein a program of a processing procedure required for the user terminal 30 to operate. The RAM 42 is volatile memory for temporarily retaining data therein. The CPU 41 controls all the operations performed on the user terminal 30 side. The CPU 41 constitutes the notifying section defined by the present invention.

The input section 33 constitutes the receiving section defined by the present invention. The input section 33 includes an operating panel for receiving input operations performed by the user. The output section 34 includes a display for displaying output data. The hard disk 32 is a mass storage magnetic disk. The hard disk 32 has stored therein a control application for causing the user terminal 30 to perform operations required for implementation of the contents providing system.

The control application comprises the following programs (A) to (G): program (A) of causing the CPU 41 to decrypt a contents data encrypted by the transmission control section 12; program (B) of causing the CPU 41 to decode a contents data encoded by the transmission control section 12; program (C) of causing the display of the output section 34 to display data on the decoded contents data; program (D) of causing the RAM 42 to retain information on a resolution desired by the user which has been inputted by the user to the input section 33; program (E) of causing the CPU 41 to transmit the information on the desired resolution retained in the RAM 42 to the charging server 50; program (F) of causing the CPU 41 to store the data on the decoded contents data into the hard disk 32; and program (G) of causing the CPU 41 to delete other data transmitted from the contents storage server 10.

The interface section 31 is connected to the network 100 via a router 101. Information on a charging process is fed from the user terminal 30 to the charging server 50 via the router 101 and network 100.

The charging server 50 includes interface section 53, storage section 51, and charge control section 52.

The storage section 51 constitutes a charge information recording section defined by the present invention. The storage section 51 has, as recorded therein, decryption key information, charge information, decoding key information and other information. Further, the storage section 51 has, as recorded therein, a rule table specifying the correspondence of a quality level with a charge level and a decoding process information for each of contents data stored in the storage section 11 of the contents storage server 10.

The charge control section 52 carries out a charging process based on the information on a resolution transmitted from the user terminal 30 and the rule table recorded in the storage section 51. Further, after the charging process with respect to the user has been completed, the charge control section 52 transmits a decoding key corresponding to the charging process to the user terminal 30.

Figure 2A:
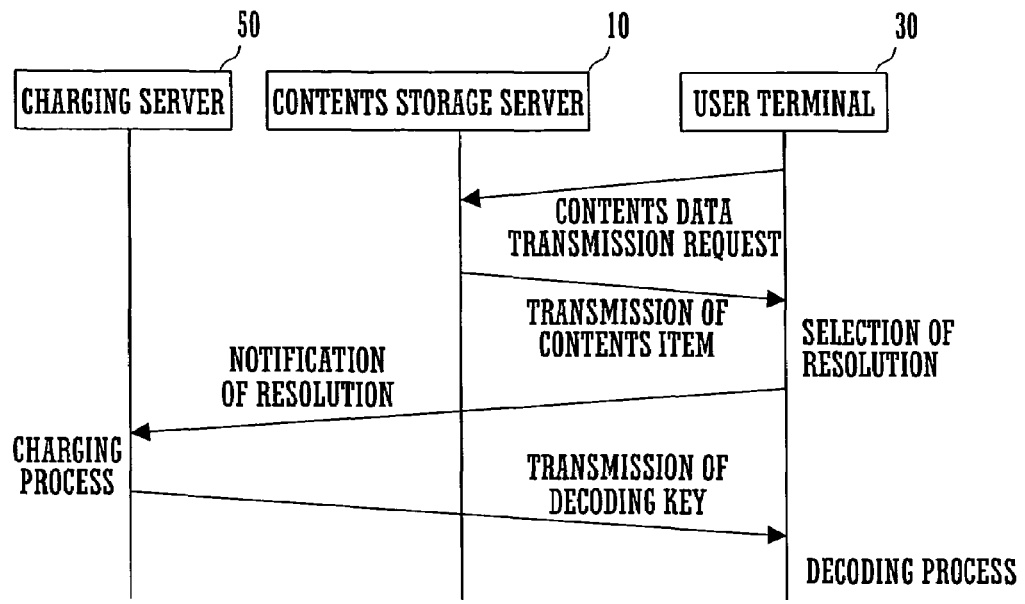
FIGS. 2A and 2B illustrate a communication technique adopted in the contents providing system.

FIG. 2A schematically illustrates a procedure of communication among the contents storage server 10, user terminal 30 and charging server 50. Initially, in response to an input operation performed by the user, the user terminal 30 makes a contents data transmission request to the contents storage server 10.

Subsequently, the contents storage server 10 encodes a contents data meeting the transmission request by vector coding to generate an encoded contents data. The contents storage server 10 transmits the encoded data thus generated to the user terminal 30. In transmitting the encoded contents data, the contents storage server 10 also transmits to the user terminal 30 information about charges for respective information amounts (resolutions), sample images showing corresponding reproduction levels of respective resolutions, information on the IP address of the charging server 30, and other information. Immediately after the transmission of these information items, the contents storage server 10 disconnects from the user terminal 30.

After having been disconnected from the contents storage server 10, the user terminal 30 assumes a standby state until completion of the selection of a resolution by the user. Upon completion of the selection of the desired resolution for the image of the contents data, the user terminal 30 establishes connection with the charging server 50 and then notifies the charging server 50 of information specifying the contents data meeting the transmission request and information on the resolution selected by the user. These information items are included in the charge information.

In response to the notification of the charge information including the contents specifying information and the resolution information from the user terminal 30, the charging server 50 carries out the charging process with respect to the user based on the description of the notification. With the charging process having been completed, the charging server 50 transmits a decoding key corresponding to a charge level to the user terminal 30. After this transmission has been completed, the charging server 50 disconnects from the user terminal 30. The user terminal 30 having obtained the decoding key from the charging server 50 decodes the encoded contents data meeting the received transmission request by using the decoding key.

Figure 2B:
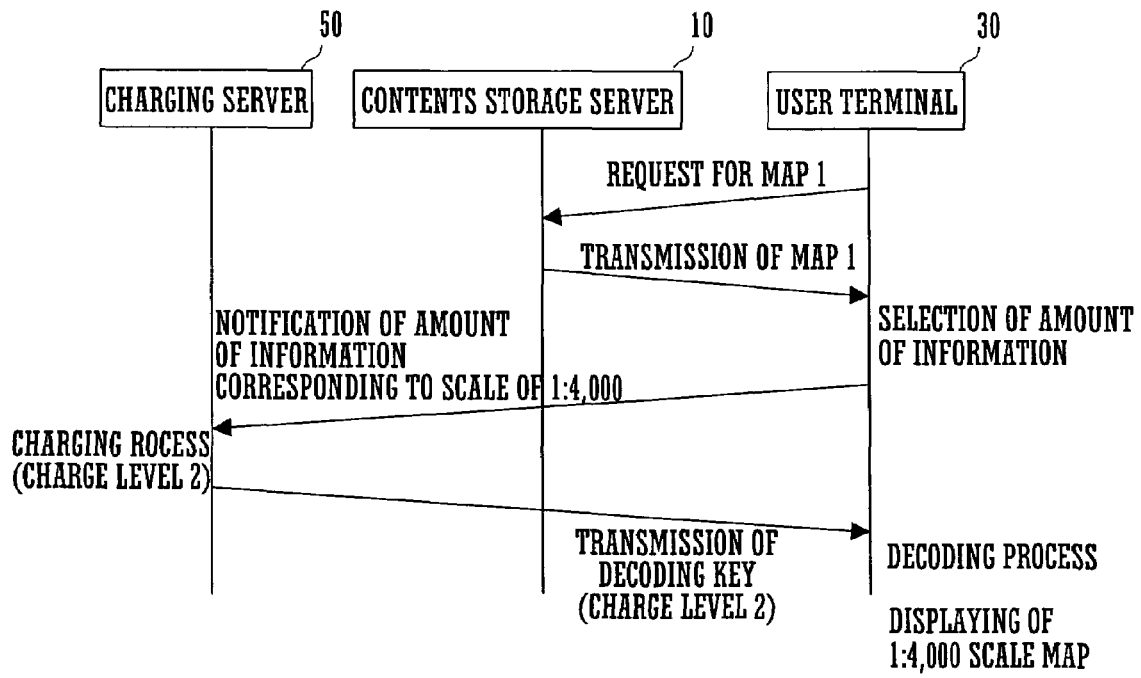

FIG. 2B illustrates the case where the contents data in FIG. 2A is map data. In this case the user terminal 30 makes a request for a specific map data (map 1) to the contents storage server 10 in response to an input operation by the user. The contents storage server 10, in turn, transmits an encoded data obtained from the map data (map 1) requested and then disconnects from the user terminal 30.

The user terminal 30 assumes the standby state until an amount of information, which is desired by the user for the received map data, is inputted. In the present embodiment such an amount of information is determined based on a scale of a map. For example, if the user wants to know schematic geographical features of a certain area, it is sufficient for the user to select a relatively small amount of information corresponding to a scale of about 1:160,000. On the other hand, if the user wants to know information about a state of contour lines or residences in a certain area, it is recommended that the user select a relatively large amount of information corresponding to a scale of 1:2,000 or a larger amount of information.

The amount of information is proportional to the resolution of a map data file to be restored. Therefore, the amount of information for such a map data file may be determined based on a desired resolution. If the desired contents data comprises image data on a landscape photo or a portrait of a person, the amount of information is preferably determined based on a desired resolution.

In response to an operation performed by the user to input an amount of information, the user terminal 30 notifies the charging server 50 of the amount of information (corresponding to a scale of 1:4,000 in this case) determined by the user. The charging server 50 determines a charge level based on the name of the map data file and the amount of information notified and then transmits to the user terminal 30 a decoding key required to restore the 1:4,000 scale map data. Immediately after the transmission, the charging server 50 disconnects from the user terminal 30. The user terminal 30 uses the received decoding key to restore the 1:4,000 scale map data.

FIG. 3 shows a portion of the rule table recorded in the storage section 51 of the charging server 50. The rule table is a record of the correspondence of an amount of information with a charge level and a decoding key for each of map data files stored in the storage section 11. Once a map data file name and an amount of information have been specified, a charge level to be applied to the user and a decoding key to be transmitted to the user terminal 30 after charging are specified.

Here, for convenience, information amounts S, M, L and LL are made to correspond to a scale between 1:160,000 and 1:80,000, a scale between 1:80,000 and 1:20,000, a scale between 1:20,000 and 1:4,000, and a scale between 1:4,000 and 1:2,000, respectively.

In this embodiment charge level 0 corresponding to information amount S means no charge. For this reason a decoding key for obtaining a contents data having information amount S for each map data file is transmitted to the user terminal 30 before the charging process. Specifically, in transmitting from the contents storage server 10 an encoded data obtained from the map data file meeting the transmission request, the decoding key for obtaining the contents data having information amount S is attached. A predetermined decoding key is thus attached with no charge in order for the user to check whether or not the received map data file is identical with the desired one.

Figure 4:
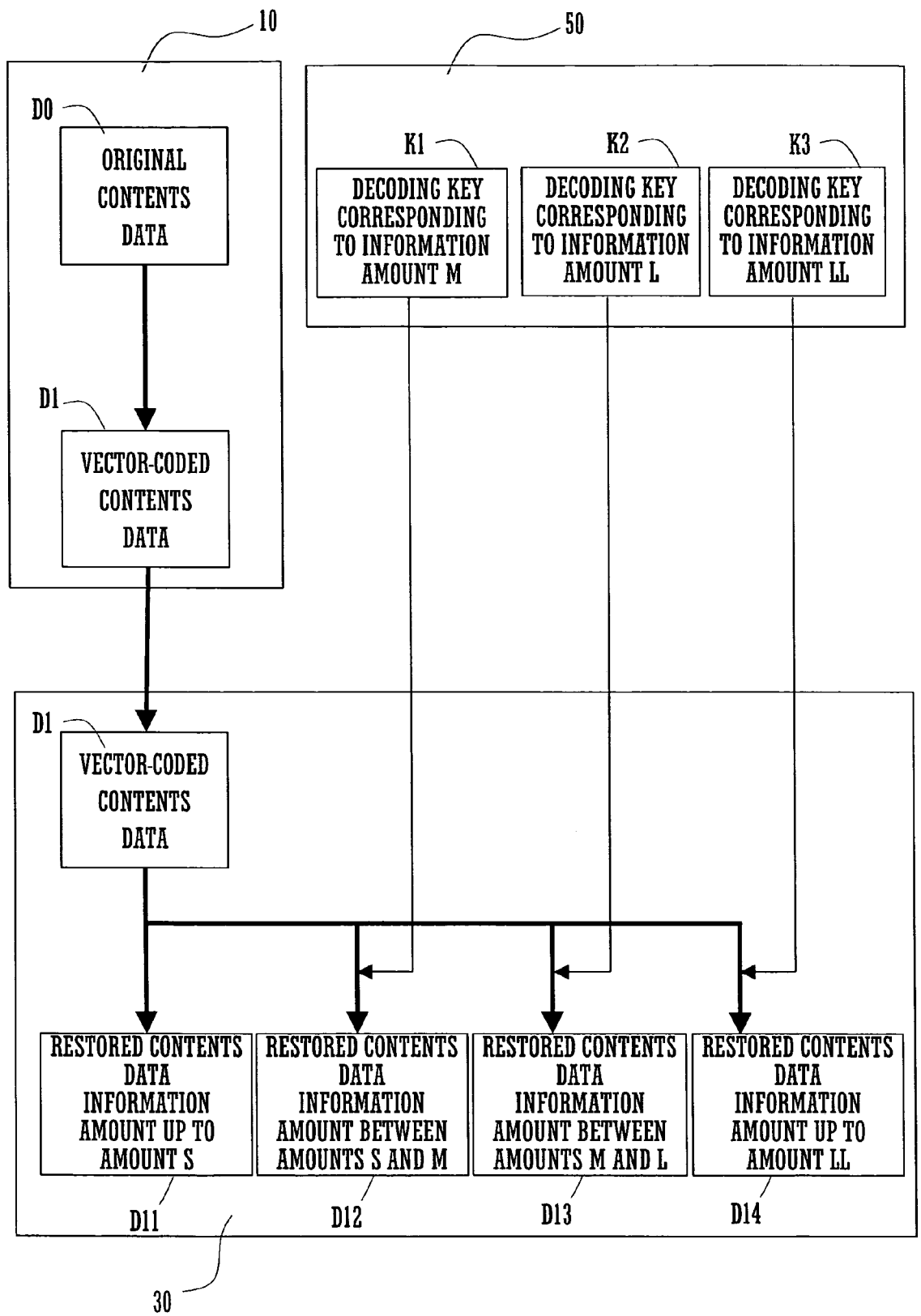
FIG. 4 illustrates a contents providing method according to the first embodiment of the present invention.

FIG. 4 illustrates one example of the technique of encoding and decoding contents. Specifically, FIG. 4 illustrates the technique of encoding a map data file having a SVG data format by vector coding.

Reference character D0 denotes an original contents data meeting a transmission request. The original contents data is subjected to vector coding at the transmission control section 12, so that vector-coded data D1 is generated. The vector-coded data D1 thus generated is transmitted to the user terminal 30 along with a decoding key corresponding to information amount S for decoding the vector-coded data D1.

In order for the user terminal 30 to receive a decoding key corresponding to any one of information amounts M, L and LL, the user terminal 30 has to issue a request for the decoding key to the charging server 50. This request is made by notifying the charging server 50 of the desired amount of information from the user terminal 30.

In response to the notification of the desired amount of information, the charging server 50 carries out a charging process corresponding to the desired amount of information and then transmits a decoding key corresponding to the desired amount of information to the user terminal 30. If the user terminal 30 receives decoding key K1 from the charging server 50, the user terminal 30 becomes able to restore a contents data D12 having an amount of information ranging between information amount S and information amount M. If the user terminal 30 receives decoding key K2 from the charging server 50, the user terminal 30 becomes able to restore a contents data D13 having an amount of information ranging between information amount M and information amount L. If the user terminal receives decoding key K3 from the charging server 50, the user terminal 30 becomes able to restore a contents data D14 having an amount of information ranging between information amount L and information amount LL.

In the present embodiment all the contents storage server 10 has to do in response to the user terminal 30 is to carry out the process of vector-coding the contents data meeting the transmission request and then transmitting the vector-coded contents data to the user terminal 30. Also, all the charging server 50 has to do in response to the user terminal 30 is to carry out the process of receiving a notification of a desired amount of information from the user terminal 30 and then transmitting a decoding key corresponding to the desired amount of information to the user terminal 30.

Thus, the above-described embodiment makes it possible to lighten the load to be imposed on the contents storage server 10 and the charging server 50 in responding to the user terminal 30.

Figure 5:
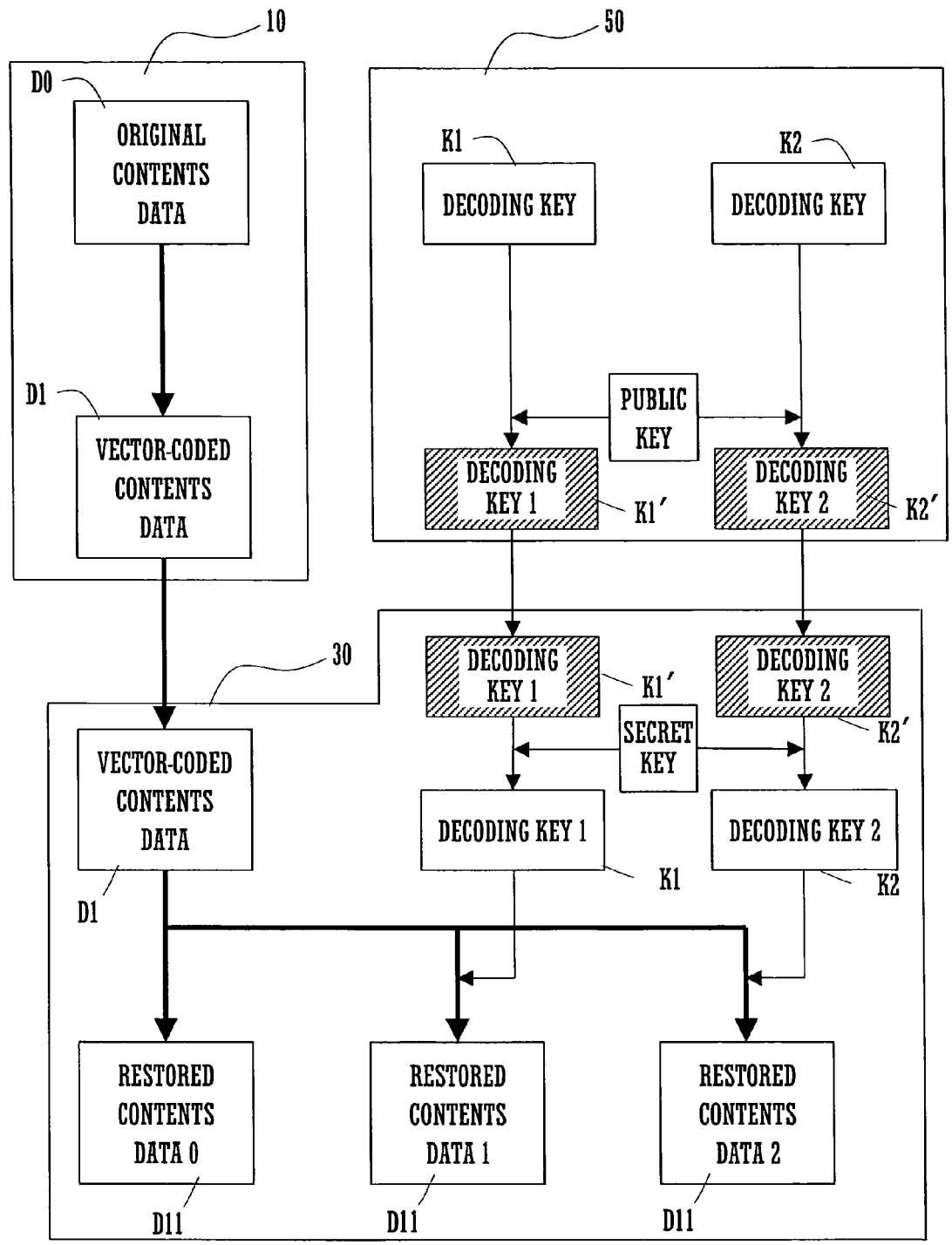
FIG. 5 illustrates a contents providing method according to a second embodiment of the present invention.

FIG. 5 illustrates a contents providing method according to a second embodiment of the present invention. The second embodiment is different from the first embodiment in that the charging server 50 encrypts a decoding key before transmitting it to the user terminal 30. In the second embodiment the charging server 50 obtains a public key of the user terminal 30 and encrypts the decoding key by using the public key. In turn, the user terminal 30 decrypts the decoding key by using its own secret key. The user terminal 30 having obtained the decoding key in a clear text form obtains a desired contents data by using the decoding key received, as in the first embodiment.

In the present embodiment it is possible to use different passwords each corresponding to a respective one of information amounts of contents data as decoding keys. In this case, if the user terminal 30 is installed with a program for notifying the charging server 50 which one of the passwords the user terminal 30 has used, the charging process can be carried out smoothly.

Figure 6:
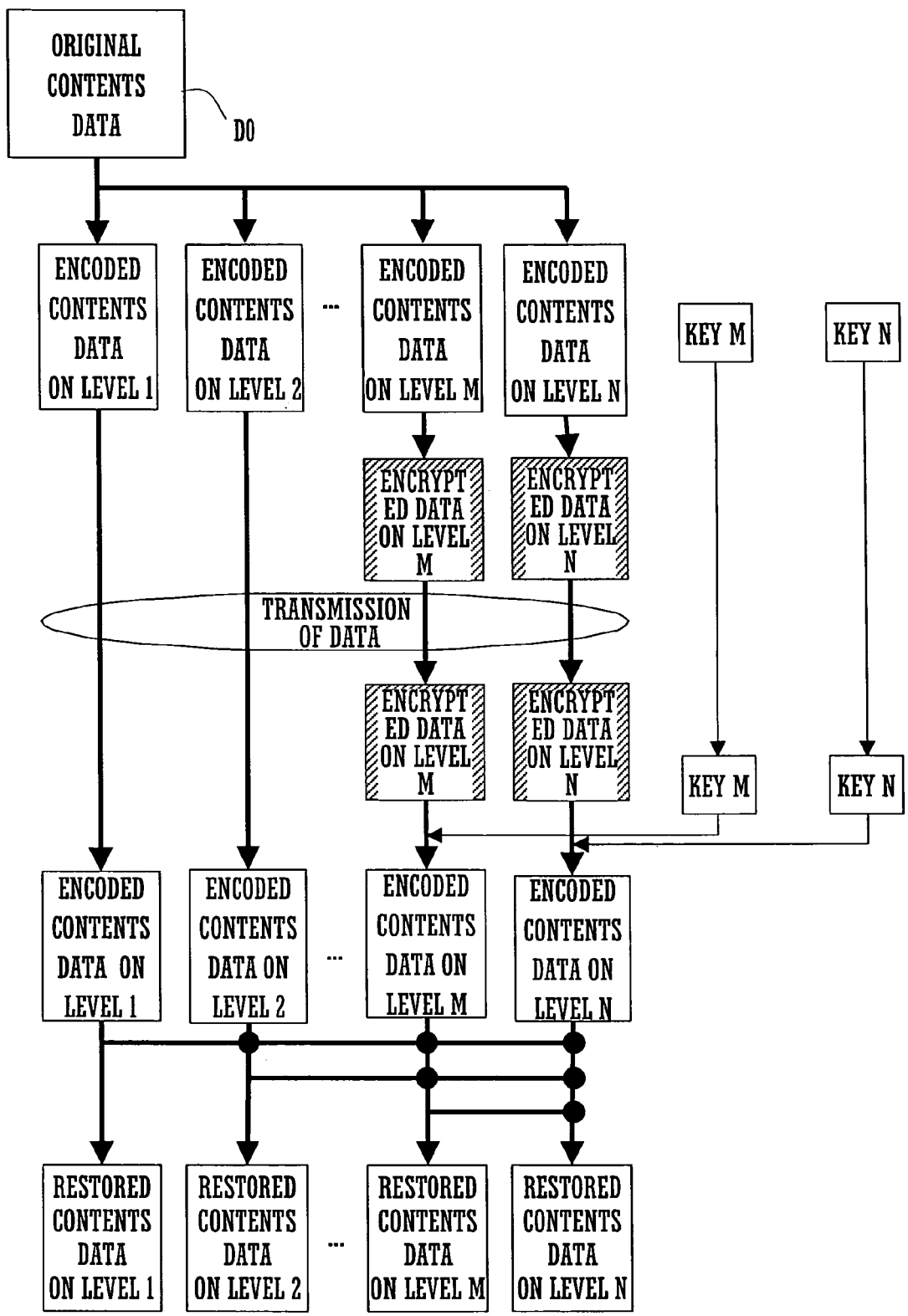
FIG. 6 illustrates a contents providing method according to a third embodiment of the present invention.

FIG. 6 illustrates a contents providing method according to a third embodiment of the present invention. The third embodiment is different from the first embodiment in that an encoded data is generated through hierarchical coding. In the third embodiment the contents storage server 10 generates such an encoded data through hierarchical coding of a contents data meeting a transmission request.

Of encoded data, those data on a predetermined hierarchical level or a lower level are not encrypted and hence are transmitted as kept in the form of clear text to the user terminal 30. In this embodiment encoded data on hierarchical levels lower than level M are transmitted as kept in the form of clear text. On the other hand, encoded data on hierarchical levels not lower than level M are encrypted using a predetermined common key.

The user terminal 30 can obtain content data on hierarchical levels lower than level M without any charging process. For the user terminal 30 to obtain contents data on levels not lower than level M, it is required that the charging server 50 carry out a corresponding charging process and then transmit a corresponding common key to the user terminal 30. The user terminal 30 can obtain a contents data having a larger amount of information by obtaining an encoded data on a higher level.

Figure 7:
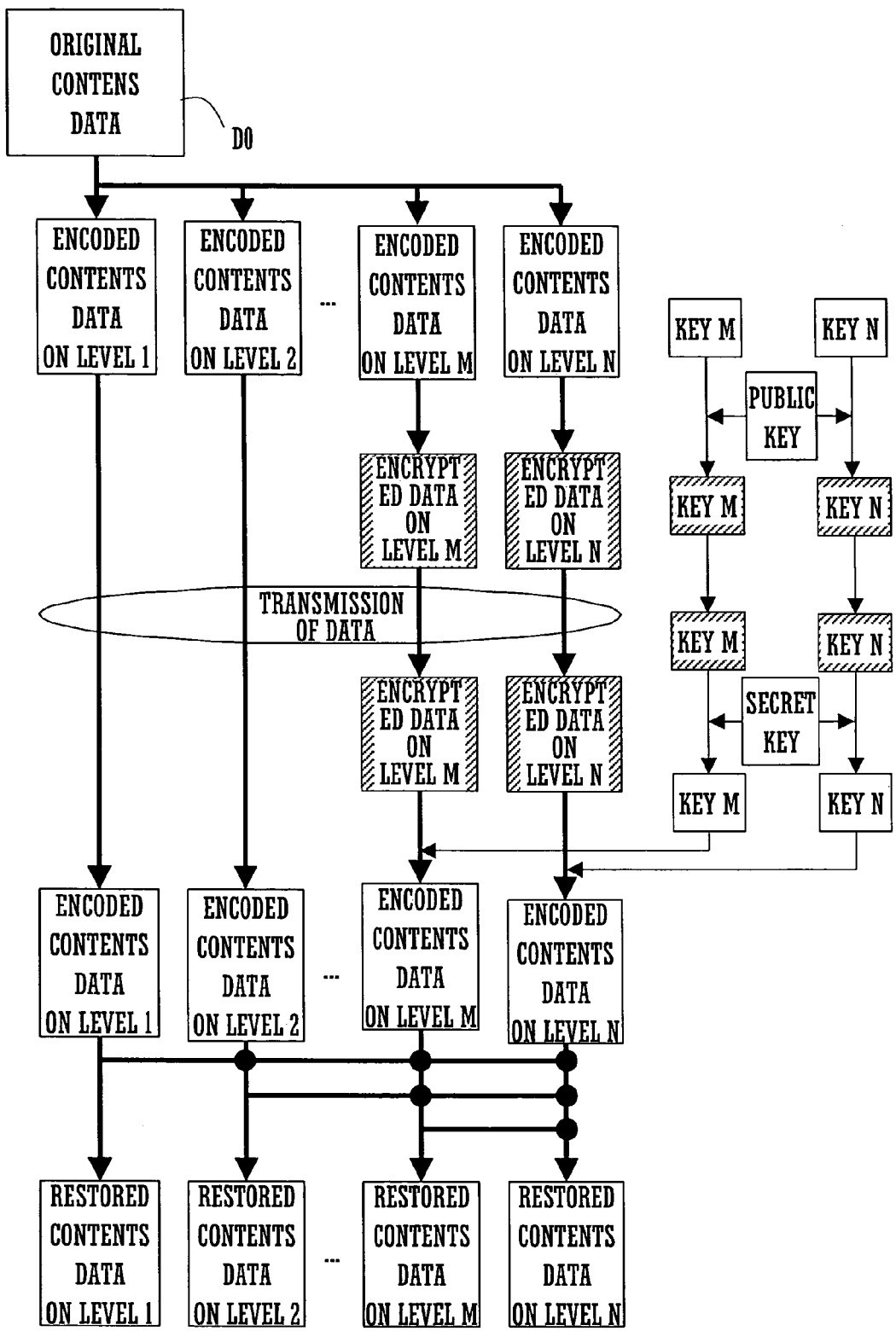
FIG. 7 illustrates a contents providing method according to a fourth embodiment of the present invention.

FIG. 7 illustrates a contents providing method according to a fourth embodiment of the present invention. The fourth embodiment is different from the third embodiment in that the charging server 50 encrypts a decoding key before transmitting it to the user terminal 30.

In the present embodiment the charging server 50 obtains the public key of the user terminal 30 before transmitting to the user terminal 30 a common key for obtaining a contents data on level M or a higher level and encrypts the common key using the public key. In turn, the user terminal 30 decrypts the common key by using its own secret key and then obtains the desired contents data by using the common key. This feature makes it possible to reduce the risk of allowing a third party to steal the data on the common key.

Figure 8:
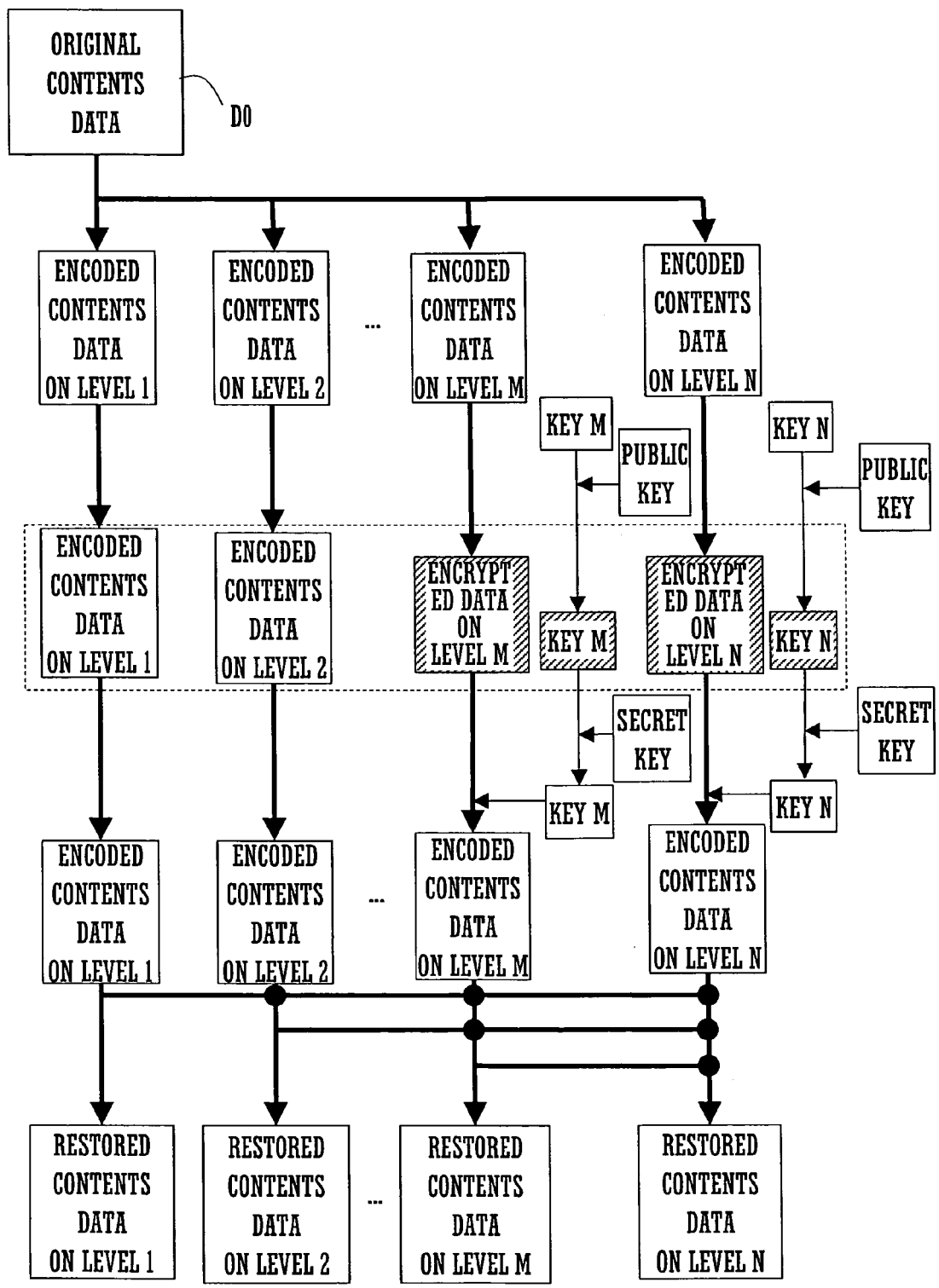
FIG. 8 illustrates a contents providing method according to a fifth embodiment of the present invention.

FIG. 8 illustrates a contents providing method according to a fifth embodiment of the present invention. The fifth embodiment is characterized in that when the contents storage server 10 transmits an encoded data to the user terminal 30, a common key for decrypting an encoded data on level M or a higher level is transmitted as an attachment.

This common key is encrypted with the public key of the user terminal 30. The present embodiment is configured such that by means of a program preinstalled in the user terminal 30, the user terminal 30 notifies the charging server 50 that the user terminal 30 has decrypted the common key by using its own secret key. Accordingly, once the user has started obtaining a contents data on level M or a higher level, the user terminal 30 notifies the charging server 50 to that effect to cause the charging server 50 to carry out a corresponding charging process.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

What is claimed is:

1. A contents providing method applicable to a contents providing system including a contents server and a user terminal which are connected to each other via a network, the method comprising:

a step in which the user terminal issues a contents data transmission request to the contents server;

a step in which the contents server encodes a contents data meeting the transmission request into an encoded data capable of being decoded to the contents data with resolution levels which vary according to which of a plurality of decoding keys is utilized by said user terminal;

a step in which the contents server transmits the encoded data, sample image data respectively representative of the resolution levels respectively associated with each of said plurality of decoding keys, and cost information corresponding to the resolution level of each of said respective sample image data, to said user terminal, wherein each said sample image data includes a different amount of information corresponding respectively to a predetermined one of said resolution levels at which said encoded data is decodable, and then disconnects from the user terminal;

a step in which the user terminal receives input information from a user in terms of said received sample image data and said received cost information indicative of a resolution/cost level of contents data selected by the user with which the contents data meeting the transmission request is to be decoded;

a step in which the user terminal re-establishes a connection with the contents server and transmits the input information on the user selected resolution/cost level to the contents server;

a step in which after having received the input information on the user selected resolution/cost level from the user terminal, the contents server carries out a charging process with respect to the user based upon the the information on the user selected resolution/cost level; and a step in which the content server transmits to the user terminal a decoding key corresponding to a charge level corresponding to the user selected resolution/cost level and then again disconnects from the user terminal, the decoding key being needed for use in a decoding process for obtaining the user selected resolution/cost level of decoded content data in the user terminal.

2. The contents providing method according to claim 1, further comprising a step in which the contents server transmits charge information on the contents data meeting the transmission request and information on an addressee to which the information on the user selected reproduction/cost level is to be transmitted, as attachments to the encoded data transmitted to the user terminal.

3. The contents providing method according to claim 2, further comprising a step in which the one of said decoding keys that the contents server transmits to the user terminal is the decoding key needed for the decoding of any of a plurality of decoding processes corresponding to a reproduction/cost level not higher than the user selected reproduction/cost level, said one of said decoding keys being transmitted as an attachment to the encoded data transmitted to the user terminal.

4. The contents providing method according to claim 3, wherein:

the contents data comprises image data; and the encoded data is a data which is capable of being decoded to any one of image data having different reproduction/cost levels not higher than said user selected reproduction/cost level according to the one of said plurality of decoding processes selected by the user.

5. The contents providing method according to claim 4, wherein the encoded data is a data generated by vector coding from contents data meeting the transmission request from the user terminal.

6. The contents providing method according to claim 4, wherein the encoded data is a data generated by hierarchical coding from contents data meeting the transmission request from the user terminal.

7. A contents providing method applicable to a contents providing system including a contents server and a user terminal which are connected to each other via a network, the method comprising:

a step in which the user terminal issues a contents data transmission request to the contents server;

a step in which the contents server encodes a contents data meeting the transmission request into an encoded data capable of being decoded to the contents data with a resolution level which varies according to which of a plurality of decoding keys is utilized;

a step in which the contents server transmits to the user terminal the encoded data, sample data corresponding respectively to each of various resolution levels at which said encoded contents data is decodable, cost information corresponding to the resolution level represented by each said sample image data for selective display to a user, and a plurality of decoding keys, and thereafter disconnects from the user terminal, the decoding keys respectively being needed for use in a decoding process for obtaining a user selected reproduction/cost level of decoded content data in the user terminal;

a step in which the user terminal receives input information on a user selected reproduction/cost level with which the contents data meeting the transmission request is to be decoded;

a step in which before the decoding key needed for the decoding process for obtaining the user selected reproduction/cost level of restored content data can be used, the user terminal re-establishes a connection with the contents server and transmits the input information on the user selected reproduction/cost level to the contents server; and a step in which the contents server carries out a charging process with respect to the user based on the received input information on the user selected reproduction/cost level.

8. A contents providing system comprising a contents server and a user terminal which are connected to each other via a network, the contents server comprising:

a recording apparatus configured to record a plurality of contents data;

an encoding section configured to encode a contents data meeting a transmission request from the user terminal such that the encoded contents data is capable of being decoded with a reproduction level which varies according to which of a plurality of decoding keys is selected;

a charge information recording apparatus configured to record desired reproduction levels made to correspond respectively to each of a plurality of charge levels and to record decoding keys for each user selectable reproduction/cost level of contents data recorded by the recording apparatus;

a transmitting apparatus configured to transmit requested contents data encoded by the encoding section, sample data corresponding respectively to the various reproduction levels at which said encoded contents data may be decoded, and a decoding key corresponding to a reproduction/charge level to the user terminal, the decoding key being needed for decoding the encoded requested contents data at a user selected reproduction/cost level; and a charging section configured to receive information on the decoding key required to be applied to the encoded requested contents data to decode the same with a resolution selected by the user and to then carry out a charging process based thereon, and the user terminal comprising:

a viewing apparatus configured to allow a user to view said sample data, said charge information associated with each resolution level represented by said sample data, and said decoded data;

a receiving section configured to receive input information on a reproduction/cost level selected by a user with which the contents data meeting the transmission request is to be decoded;

a notifying section configured to notify the contents server of the received information on the user selected reproduction/cost level, and a second receiving section configured to receive input information from said content server.

* * * * *